Dec. 19, 1961  R. O. RAGAN ET AL  3,013,923
METAL FOIL BONDING
Filed Feb. 11, 1957
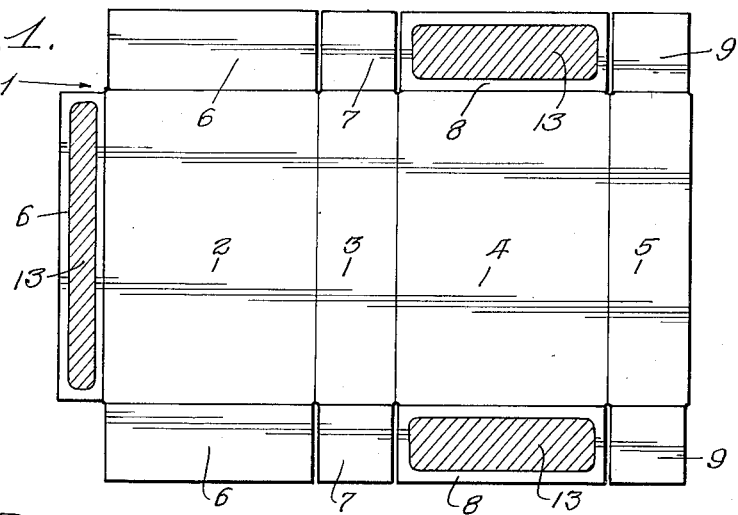
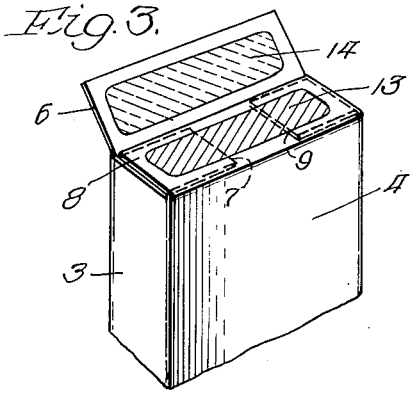
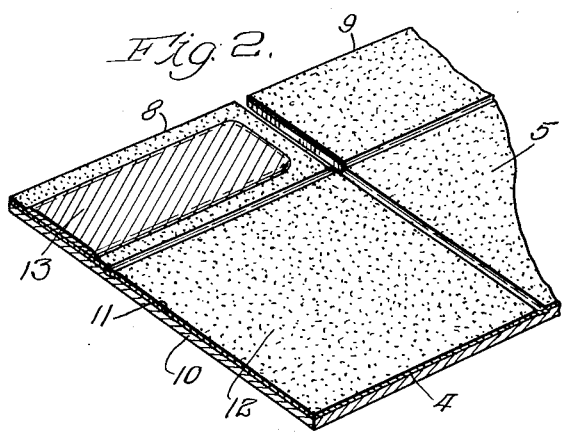
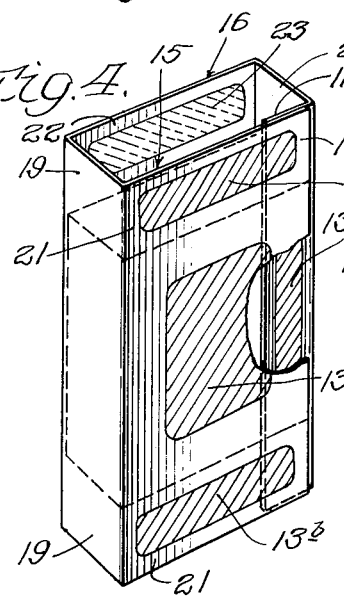
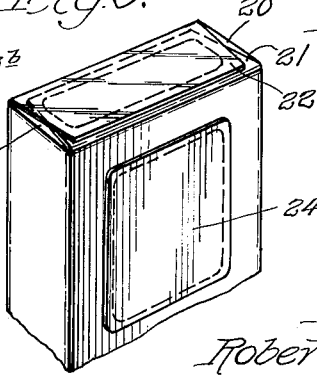
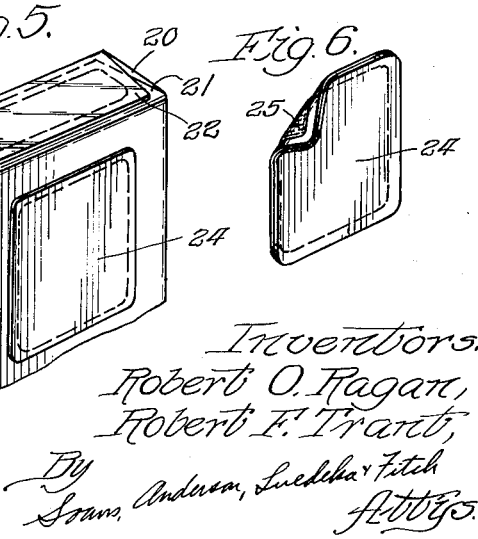
Inventors:
Robert O. Ragan,
Robert F. Trant,
By Soans, Anderson, Luedeka & Fitch
Attys.

United States Patent Office 3,013,923
Patented Dec. 19, 1961

3,013,923
METAL FOIL BONDING
Robert O. Ragan, Oak Park, and Robert F. Trant, Chicago, Ill., assignors, by mesne assignments, to Chicago Carton Company, a corporation of Delaware
Filed Feb. 11, 1957, Ser. No. 639,439
3 Claims. (Cl. 117—37)

This invention relates to the art of adhesively bonding material to metallic surfaces, for example, bonding paper and other fiber material to metal foil as when a portion of the paper side of a laminated paper and metal foil sheet is to be bonded to a portion of the foil side of the sheet. The invention relates more specifically to bonding materials as aforesaid by means of conventional, water dispersed adhesives generally used in the carton and package making arts. These conventional adhesives are mainly of dextrin type and resin emulsion type which are highly satisfactory for bonding water absorbent fiber surfaces to each other but which do not bond well or form a permanent bond to non-absorbent surfaces such as presented by metal foil.

For use in the packaging art, metal foil lined or covered wrapping paper or carton making board stock usually has its metal foil surface coated with a prime coating to provide ink adherency to the metal foil face so that identification of the goods to be enclosed in the wrapper or container, or other data, may be satisfactorily printed on the foil surface. Such prime coatings usually are thin films of an alcohol-shellac solution. Such prime coatings resist wetting by water and also tend to prevent the usual water dispersed adhesives from adhering to the prime coated surface of the metal foil.

Special adhesives are available for bonding lapped portions of a plied paper-foil member to each other when one of the surfaces bonded is a metal foil surface. The use of such special adhesives is objectionable because they do not machine well, are very slow setting in forming a bond, have a tendency to form hard-to-remove gum deposits on the machinery used, and are usually quite expensive.

The main object of the present invention is to provide an arrangement whereby ordinary water dispersed dextrin-type and water dispersed resin-emulsion type adhesives may be caused to satisfactorily bond a metal foil surface to an absorbent surface, for example, a portion of the metal foil surface of a laminated metal foil and paper container blank to a portion of the paper surface of such blank.

Other objects and advantages of the invention will be understood by reference to the following specification and accompanying drawing.

In the drawing:

FIGURE 1 is a plan view of a typical paper or fiber board box blank which has a metal foil lining on its outer surface and portions of which blank are to be adhesively secured to other portions to produce a carton;

FIGURE 2 is a fragmentary illustration on an enlarged scale of a portion of the blank represented in FIGURE 1;

FIGURE 3 is a fragmentary perspective illustration of a partially closed carton formed from the blank of FIGURE 1;

FIGURES 4 and 5 are perspective illustrations representing successive steps in the application of a laminated metal foil and paper overwrap to a package in accordance with this invention; and, FIGURE 6 is a perspective illustration of a laminated metal foil and paper label which is adapted to be applied by means of the present invention, to the outer foil surface of a package.

The box blank 1 represented in FIGURE 1 is intended to merely typify one example to which the present invention is applicable. The blank embodies foldably connected wall panels 2, 3, 4 and 5 and a side wall gluing flap 6 which is ultimately to be adhered to a portion of the wall panel 5. Suitable end closure flaps 6, 7, 8 and 9 are foldably connected to the upper and lower ends of the wall panels.

The blank 1 comprises a conventional paper or fiber board layer or ply 10 and an outer surface lining or ply 11 of aluminum metal foil (FIGURE 2) which is suitably adhered to the paper ply 10. Other metal foils, such as tin, copper and others, may be employed for the said lining or covering. The laminating of the foil to the paper board is accomplished with equipment and adhesives in accordance with common practice in the art.

In order that printing ink may be caused to adhere to the foil covered surface, the printing surface of the foil is usually coated with a thin film or prime coating usually consisting of shellac dissolved in alcohol. This prime coating is represented by the stippling 12 in FIGURE 2. This prime coating usually appears over the entire area of the carton because the prime coating material is usually applied to the entire area of the foil lined carton board stock before the carton blanks are cut from such stock.

According to the present invention, a special additional coating 13 (FIGURES 1 and 2) is applied to the prime coated, foil surface portion or portions to which another portion of the blank is to be adhered. This special coating 13 may be designated an adhesive-anchoring coating in that it serves the purpose of enabling conventional or ordinary water solution or emulsion types of adhesives such as mentioned to satisfactorily bond permanently to the underlying foil covered surfaces. Conventional water solution or emulsion types of adhesive are hereinafter referred to as water dispersed adhesives.

The adhesive-anchoring coating 13 may be any one of a number of compositions of which the following examples are representative.

*Example I*

(a) One part (by volume) "Rhoplex B–15" which is a commercial product made and sold by Rohm & Haas and is an acrylic resin emulsion; (b) one part (by volume) of a solution consisting of (by weight) 10 percent casein, one percent borax and 89 percent water; and (c) one part (by volume) of a solution of alcohol and water in equal proportions, i.e., a 50–50 alcohol and water solution.

The "Rhoplex B–15" has the following physical properties: 46.0 percent acrylic resin solids (by weight); 8.7 pounds weight per gallon; 6.0 to 6.5 pH; the size of the acrylic resin particles being less than one micron.

This formula is prepared by slowly stirring the casein-borax-water solution into the acrylic resin emulsion. There is a marked increase in viscosity of the resulting composition or mixture. The alcohol-water solution is then very slowly and carefully stirred with good agitation into said composition or mixture to produce a smooth, fluid liquid which can effectively be applied to the prime coated foil surface of the container blank by gravure, aniline rubber plate, and other forms of printing employed in the carton making and packaging industries.

Metal foil covered paper carton samples, some bearing the described prime coating on the foil surface, and some without, were printed with the above described smooth, fluid, adhesive-anchoring material to provide coatings thereof at the desired places, the coatings being force dried with hot air, and then aged for two days at 120° F. Cartons so prepared were equally well glued with ordinary dextrin adhesive and with ordinary resin emulsion adhesive applied to the paper side of the wall 5 so as to engage the area of the glue flap 6 containing the described adhesive-anchoring material as represented at 13 in FIGURE 1. The flap 6 was securely and enduringly, apparently permanently, bonded to the paper board side of the wall panel 5. A collapsed tubular carton body was thereby produced.

The aforesaid collapsed tubular body was then distended, filled, and its ends closed by folding the end flaps 6, 7, 8 and 9 into end closing position, a partially closed condition being shown in FIGURE 3. The end flaps 6 of a number of samples were coated with said conventional resin emulsion adhesive, such water dispersed adhesive coatings being applied to the paper faced sides of the flaps and such adhesive coatings being represented at 14 in FIGURE 3, to the inside or paper side of the flaps. The opposite end flaps 8 presented their metal foil lined faces for engagement by said flaps 6, and said metal foil faces were coated with said adhesive-anchoring material as represented at 13 in FIGURES 2 and 3. The adhesive bonds produced between the flaps 6 and 8 when said flaps were interengaged in face-to-face end closure relationship, were very secure and of adequately enduring and probably permanent character. It was found that these end closing operations could be effectively practiced with package closing equipment of the kinds usually employed in package filling and sealing operations by those who usually purchase their carton requirements in the form of collapsed, tubular or other collapsed forms from a carton manufacturer. The described procedure avoids the need for using special adhesive in connection with the closing and sealing of the filled metal foil lined carton and permits such operations to be effectively carried out with the same common water dispersed adhesives used in connection with the sealing of conventional all-paper cartons.

*Example II*

(*a*) One part "Rhoplex B-15"; (*b*) one part of a protein solution; and (*c*) one part of a 50-50 alcohol and water solution. (Proportions are by volume.) The protein solution (*b*) has the following composition:

100 grams of alpha protein (Glidden) slurried in 450 grams of water, to which is added a solution of 10 cc. ammonium hydroxide (NH₄OH) and 5 grams of borax in sufficient water to make 50 cc. Stir for 1 hour at 140° F.

The protein solution is slowly stirred into the acrylic resin emulsion (part (*a*)) and the alcohol-water solution is then slowly and carefully stirred in.

*Example III*

(*a*) One part (volume) neoprene latex (Du Pont #572); (*b*) one part of a solution comprising by weight, 10 percent of casein in water with 2.1 percent of ammonium hydroxide; and (*c*) one part of a 50-50 alcohol and water solution.

Solution (*b*) should be first slowly stirred into the latex (*a*), and the alcohol-water solution (*c*) then slowly stirred in.

*Example IV*

(*a*) One part (volume) "Rhoplex A.C. 33"; (*b*) one part of an alpha protein solution (composition as above in Example II), and (*c*) one part of a 50-50 alcohol-water solution. Part (*a*) is an acrylic resin emulsion having the following physical properties.

Solids _____ 46±0.5%.
Emulsion viscosity _____ 65-80 Krebs units.
pH _____ 9.0-9.5.
Sp. gravity _____ 1.04.
Lbs./gal _____ 8.67.

The protein solution is first slowly stirred into the resin emulsion, and the alcohol-water solution is then slowly stirred in.

*Example V*

(*a*) One part (volume) "Rhoplex A.C. 33"; (*b*) one part of a 20 percent (by weight) solution of dimethyl hydantoin formaldehyde resin in water (Glyco Products Co. DMHF); and (*c*) one part of a 50-50 alcohol-water solution.

Solution (*b*) is first slowly stirred into the resin emulsion (*a*) and the alcohol-water solution is then slowly stirred in.

*Example VI*

(*a*) One part (volume) neoprene latex (Du Pont #572); (*b*) one part of a 20 percent (by weight) solution of dimethyl hydantoin formaldehyde resin in water; and (*c*) one part of a 50-50 alcohol-water solution.

Solution (*b*) is first slowly stirred into the latex (*a*), and the alcohol-water solution (*c*) is then slowly stirred in.

The described adhesive-anchoring compositions are very effective for the purpose described and when used as a base coat on aluminum foil, "Scotch" pressure-sensitive tape does not lift the coating from the foil and conventional dextrin and resin emulsion adhesives bond well to all of them.

The foregoing examples of adhesive-anchoring compositions have in common the characteristics of good adhesion to metal foil while also being readily moistened with water so that the usual water-bearing or water dispersed adhesives (such as the said dextrin and resin-emulsion types) will combine with or otherwise adhere strongly to the metal foil. Also, in each, the alcohol component serves to dissolves the alcohol-shellac prime coating so that the adhesive-anchoring composition or coating can reach the foil and become strongly bonded thereto.

In each of the above six examples, the component (*a*) is primarily a water dispersed adhesive and the component (*b*) is a thickening agent and a synergist with component (*a*). The alcohol-water solution (*c*) in each example is a thinning agent whereby the incorporation of alcohol into the thickened water bearing adhesive solution is made practicable. The addition of alcohol to the composition is desirable to provide an agent which will dissolve the shellac film on the foil to thereby permit the adhesive-anchoring coating to engage and bond to the foil. Also, the addition of considerable alcohol to the coating makes it easier to dry the coating after its application to the foil surface, whether or not a shellac or other coating is present. Normally, these water dispersed adhesives will not tolerate alcohol. However, by very slowly and carefully stirring the described alcohol-water solutions into the thickened adhesive base, there is obtained an adhesive composition which is quite stable, does not precipitate the solids, and is thin enough to be applied by gravure and other printing procedures.

The film of adhesive-anchoring material after being dried on the foil (with hot air or any other suitable manner), becomes a non-tacky film which permits the blanks to be stacked without adhering to each other for handling, shipping, storage, aging and other purposes.

The described adhesive-anchoring coating may be employed in the absence of a prime coating for ink adherency in situations where the carton is not to be printed or where special printing techniques are to be employed to apply the desired data to the uncoated foil surface. The adhesive-anchoring coating, as already indicated, has good adherence to the metal foil and will thus provide a coated foil surface to which the conventional water dispersed adhesive will effectively bond.

The water dispersed adhesive may be applied to either the adhesive-anchoring coating or to the paper faced area which will lap over said coating. Effective adhesion of the lapped parts is obtained in both ways. In some instances, the adhesive may be applied to both surfaces, but this is not usually required or helpful in most cases.

The commercial effectiveness of the adhesive-anchoring coating has been demonstrated by a user of food trays who was able to switch from the setting up and adhesive bonding of plain, untreated paper or fiber board trays in his machine to foil-lined trays bearing adhesive-anchoring coatings in accordance with this invention, without even stopping the machine or making any adjustment whatever. Had the adhesive-anchoring coating not been on the foil lined trays, it would have been necessary to remove the existing adhesive from the machine and substitute a special foil adhesive and to run the machine at a considerably slower production rate when the foil lined trays were substituted for the plain paper trays.

The invention as described has particular utility for the packaging industry wherein the use of a single line of container filling, closing and sealing apparatus is successively used for handling a variety of containers for different products and where the apparatus is stopped from time to time to permit adjustment for the handling of different styles and sizes of containers and for other reasons. Under such circumstances, the use of special foil bonding adhesives is very highly objectionable for the reasons already indicated. The said objections do not apply when the conventional water dispersed adhesives are employed.

Another application of the invention is that of preparing lined paper and metal foil overwraps for application to a package with the said conventional adhesives. For example, as shown in FIGURE 4, a package 15 is represented in an intermediate stage in the process of applying an overwrap 16 to the package. As shown, the overwrap 16 has been wrapped around four sides of the package 15 and the margins 17 and 18 of the wrapper brought into overlapping relationship. When such an overwrap has a metal foil outer surface, a coating 13a of one of the above described or an equivalent adhesive-anchoring material is applied to the outside metal foil surface of the wrapper margin 17. Any of the conventional adhesives applied to the inner face of the margin 18 (or over the coating 13a) will then be capable of effectively bonding the inner or paper side of the margin 18 to the foil surface of the underlying marginal portion 17.

The ends of the package 15 are next covered by tucking inwardly the narrow upper and lower wall portions 19 and 20, folding the upper and lower end wall portions 21 inwardly over the tucked-in portions 19 and 20, and then folding the opposite upper and lower end wall portions 22 into outside overlapping relation to the end portions 21. The end portions 21 present outer metal foil surface portions for engagement by the paper inner face of the wrapper portion 22. To enable a water dispersed adhesive to securely bond the folded-in wrapper ends in closed condition, the metal foil surface of the end portions 21 are provided with coatings 13b of a suitable adhesive-anchoring composition so that the conventional adhesive indicated at 23 on the inside face of the wrapper end portion 22 will bond securely to the end closure portion 21.

If a conventional paper backed metal foil label is to be applied to a wall of the package which presents a metal foil outer surface, the wall portion to which the label is to be applied may have an area provided with a coating 13c of the adhesive-anchoring composition. The paper backed label 24 (FIGURES 5 and 6) may have a coating 25 of the selected water dispersed adhesive on its paper back which may be brought into contact with the coating 13c of adhesive-anchoring material to insure secure bonding of the label to the package wall. The adhesive 25 on the label may be freshly applied when the label is to applied to the package or it may be in the form of a dried coating of adhesive which may be moistened preliminary to the application of the label to the package.

Other applications of the invention may arise from time to time, and those above described are not intended to limit the scope of the invention. Also, other compositions having the characteristics and capacities of the described adhesive-anchoring coating compositions may be produced, and changes may be made in those described while retaining the principles of the invention.

I claim:

1. A method of improving the bondability of a prime coated metal foil to water-dispersed adhesive, which method comprises the steps of coating selected areas of a prime coating bonded to the surface of a metallic foil with liquid adhesive-anchoring composition, said composition comprising organic water-dispersed adhesive, organic adhesive thickening agent for said adhesive and an aqueous solution or an alcohol which is a solvent for said prime coating, permitting said adhesive-anchoring composition to penetrate said prime coating, and drying said adhesive-anchoring composition in said areas to a non-tacky condition, whereby said adhesive-anchoring composition securely bonds to said prime coating and the adjacent surface of said metal foil and is water-moistenable and bondable to water-dispersed adhesive.

2. A method of improving the bondability of paper backed, prime coated metal foil to water-dispersed adhesive, which method comprises the steps of coating selected areas of an exposed prime coating bonded to one side of a metal foil, a paper backing being secured to the opposite side of said foil, with liquid adhesive-anchoring composition, said composition comprising organic water-dispersed adhesive, organic adhesive thickening agent for said water-dispersed adhesive, and an aqueous solution of an alcohol which is a solvent for said prime coating, permitting said adhesive-anchoring composition to penetrate said prime coating, and drying said adhesive-anchoring composition in said areas to a non-tacky condition, whereby said adhesive-anchoring composition securely bonds to said prime coating and the adjacent surface of said metal foil, and is water-moistenable and bondable to water-dispersed adhesive.

3. A method of improving the bondability of paper backed, prime coated metal foil to water-dispersed adhesive, which method comprises the steps of coating an exposed prime coating bonded to one surface of a metal foil, a paper backing being secured to the opposite surface of said foil, with adhesive-anchoring composition, said composition comprising approximately equal parts of organic polymeric water-dispersed adhesive, proteinaceous adhesive thickening agent for said water-dispersed adhesive, and an aqueous alcohol solution, said solution comprising about equal parts of alcohol and water, said alcohol being a solvent for said prime coating, permitting said adhesive-anchoring composition to penetrate said prime coating, and drying said coating of adhesive-anchoring composition to a non-tacky condition, whereby said adhesive-anchoring composition securely bonds to said prime coating and to adjacent surface of said metal foil and is water-moistenable and bondable to water-dispersed adhesive.

References Cited in the file of this patent

UNITED STATES PATENTS

| | | |
|---|---|---|
| 1,439,743 | Mathes | Dec. 26, 1922 |
| 1,883,396 | Moss | Oct. 18, 1932 |
| 2,302,378 | Rasmussen | Nov. 17, 1942 |
| 2,310,712 | Schmied | Feb. 9, 1943 |
| 2,429,223 | Eustis et al. | Oct. 21, 1947 |
| 2,544,146 | Erikson | Mar. 6, 1951 |
| 2,677,672 | Luce | May 4, 1954 |
| 2,694,028 | Rapp | Nov. 9, 1954 |
| 2,714,562 | Hechtman | Aug. 2, 1955 |
| 2,720,496 | Bushnell | Oct. 11, 1955 |
| 2,726,979 | Grant | Dec. 13, 1955 |
| 2,758,035 | Matthes | Aug. 7, 1956 |
| 2,796,362 | Wooding et al. | June 18, 1957 |
| 2,824,077 | Priest | Feb. 18, 1958 |

UNITED STATES PATENT OFFICE
CERTIFICATE OF CORRECTION

Patent No. 3,013,923                          December 19, 1961

Robert O. Ragan et al.

It is hereby certified that error appears in the above numbered patent requiring correction and that the said Letters Patent should read as corrected below.

Column 4, line 32, for "dissolves" read -- dissolve --; column 5, line 71, after "to" insert -- be --; column 6, line 15, for "or" read -- of --.

Signed and sealed this 15th day of May 1962.

(SEAL)
Attest:

ERNEST W. SWIDER                                  DAVID L. LaDD
Attesting Officer                                   Commissioner of Patents